United States Patent [19]
Lynch

[11] Patent Number: 5,930,820
[45] Date of Patent: Jul. 27, 1999

[54] DATA CACHE AND METHOD USING A STACK MEMORY FOR STORING STACK DATA SEPARATE FROM CACHE LINE STORAGE

[75] Inventor: Thomas W. Lynch, Austin, Tex.

[73] Assignee: Advanced Micro Devices, Inc., Sunnyvale, Calif.

[21] Appl. No.: 08/617,412

[22] Filed: Mar. 18, 1996

[51] Int. Cl.$^6$ .................................................. G06F 13/00
[52] U.S. Cl. ......................................... 711/132; 711/126
[58] Field of Search ................................. 395/459, 436, 395/437, 453; 711/109, 110, 126, 132

[56] References Cited

U.S. PATENT DOCUMENTS

| | | | |
|---|---|---|---|
| 3,889,243 | 6/1975 | Drimak | 711/132 |
| 4,794,524 | 12/1988 | Carberry et al. | 711/126 |
| 5,029,070 | 7/1991 | McCarthy et al. | 711/143 |
| 5,043,870 | 8/1991 | Ditzel et al. | 711/132 |
| 5,107,457 | 4/1992 | Hayes et al. | 711/132 |
| 5,388,245 | 2/1995 | Wong | 711/118 |
| 5,502,833 | 3/1996 | Byrn et al. | 711/132 |
| 5,584,038 | 12/1996 | Papworth et al. | 711/105 |

OTHER PUBLICATIONS

Patent Abstracts of Japan, vol. 095, No. 006, Jul. 31, 1995 & JP 07 064858, Mar. 10, 1995.
Patent Abstracts of Japan, vol. 014, No. 279, Jun. 15, 1990 & JP 02 081241, Mar. 22, 1990.
Lopriore, L., "Stack Cache Memory for Block–Structured Programs," Computer Journal, vol. 37, No. 7, Jan. 1, 1994, pp. 610–620.
International Search Report dated Jul. 24, 1997, for related PCT application No. PCT/US97/01091.

*Primary Examiner*—Glenn Gossage
*Attorney, Agent, or Firm*—Conley, Rose & Tayon, PC

[57] ABSTRACT

A data cache and method for manipulating data in a microprocessor are disclosed. The data cache stores stack data within a stack memory separate from a cache line oriented storage used for non-stack data. Data may be pushed, popped, and accessed via an offset from the stack memory without generating main memory addresses. A load/store unit coupled to the data cache may be configured to perform the address generation associated with stack accesses in parallel with performing the access to the stack memory. If the corresponding data is not stored within the stack memory, then an access to the cache line oriented storage may be performed. Therefore, no time penalty is assessed for missing the stack memory. A stack memory is contemplated for use with respect to subroutine parameter passing. The calling routine may perform multiple push commands to place parameters for use by the subroutine onto the stack. The subroutine may then access and modify the parameters upon the stack. Finally, the calling routine may perform multiple pop commands to remove the parameters from the stack.

18 Claims, 3 Drawing Sheets

DATA CACHE AND METHOD USING A STACK MEMORY FOR STORING STACK DATA SEPARATE FROM CACHE LINE STORAGE

BACKGROUND OF THE INVENTION

1. Field of the Invention

This invention is related to the field of microprocessors and, more particularly, to caching structures within microprocessors in which stack data is stored within a stack structure.

2. Description of the Relevant Art

Superscalar microprocessors achieve high performance by simultaneously executing multiple instructions during a clock cycle and by specifying the shortest possible clock cycle consistent with the design. As used herein, the term "clock cycle" refers to an interval of time during which the pipeline stages of a microprocessor perform their intended functions. The resulting values are moved to the next pipeline stage in response to a clock signal defining the clock cycle.

Since superscalar microprocessors execute multiple instructions per clock cycle and the clock cycle is short, a high bandwidth memory system (i.e. a memory system that can provide a large number of bytes in a short period of time) is required to provide instructions and data to the superscalar microprocessor. Without a high bandwidth memory system, the microprocessor would spend a large number of clock cycles waiting for instructions or data to be provided, then would execute the received instructions and/or the instructions dependent upon the received data in a relatively small number of clock cycles. Overall performance would be degraded by the large number of idle clock cycles. However, superscalar microprocessors are ordinarily configured into computer systems with a large main memory comprised of dynamic random access memory (DRAM) cells. DRAM cells are characterized by access times which are significantly longer than the clock cycle of modern superscalar microprocessors. Also, DRAM cells typically provide a relatively narrow output bus to convey the stored bytes to the superscalar microprocessor. Therefore, DRAM cells provide a memory system that provides a relatively small number of bytes in a relatively long period of time, and do not form a high bandwidth memory system.

Because superscalar microprocessors are typically not configured into a computer system with a memory system having sufficient bandwidth to continuously provide instructions and data, superscalar microprocessors are often configured with caches. Caches are storage devices containing multiple blocks of storage locations, configured on the same silicon substrate as the microprocessor or coupled nearby. The blocks of storage locations are used to hold previously fetched instruction or data bytes. A block of storage stores a "line" of bytes (i.e. a number of contiguous bytes). The line is transferred to and from main memory as a unit. Bytes within a line can be transferred from the cache to the destination (a register or an instruction processing pipeline) quickly; commonly one or two clock cycles are required as opposed to a large number of clock cycles to transfer bytes from a DRAM main memory.

When a cache is searched for bytes residing at an address, a number of bits from the address are used as an "index" into the cache. The index selects a block or blocks of storage within the cache, and therefore the number of address bits required for the index is determined by the number of rows configured into the cache. The act of selecting a row via an index is referred to as "indexing". The addresses associated with bytes stored in the multiple blocks of a row are examined to determine if any of the addresses stored in the row match the requested address. If a match is found, the access is said to be a "hit", and the cache provides the associated bytes. If a match is not found, the access is said to be a "miss". When a miss is detected, the bytes are transferred from the memory system into the cache. The addresses associated with bytes stored in the cache are also stored. These stored addresses are referred to as "tags" or "tag addresses". It is noted that a cache may be configured in a set-associative or direct-mapped configuration.

A high bandwidth memory system is particularly important to a microprocessor implementing the x86 microprocessor architecture. The x86 architecture implements a relatively small register set. Consequently, many data values which a program is manipulating are stored within a stack. In particular, values passed between a calling routine and the subroutine called are often passed through the stack. As will be appreciated by those of ordinary skill in the art, a stack is a data storage structure implementing a last-in, first-out (LIFO) storage mechanism. Data is "pushed" onto a stack (i.e. the data is stored into the stack data structure) and "popped" from the stack (i.e. the data is removed from the stack data structure). When the stack is popped, the data removed is the data that was most recently pushed. The ESP register of the x86 architecture stores the address of the "top" of a stack within main memory. The top of the stack is the storage location which is storing the data that would be provided if the stack is popped.

Since data on the stack is manipulated often, it would be advantageous to provide relatively quick access to data on the stack. One use of the stack, for example, is in passing input and output parameters between subroutines of a program and the routines calling those subroutines. The parameters may be pushed onto the stack, accessed by the subroutine, and popped from the stack upon return to the calling routine. In particular, accessing stack data without having to perform an address generation may improve microprocessor performance by allowing instructions which access the stack to fetch their operands earlier.

SUMMARY OF THE INVENTION

The problems outlined above are in large part solved by a data cache in accordance with the present invention. The data cache stores stack data within a stack memory separate from the cache line oriented storage used for non-stack data. Data may be pushed, popped, and accessed via an offset from the stack memory without generating main memory addresses. Advantageously, time previously consumed to generate the address may be eliminated from stack data accesses. Performance of a microprocessor employing the data cache may be enhanced by the more rapid access to stack data afforded by the data cache.

A load/store unit coupled to the data cache may be configured to perform the address generation associated with stack accesses in parallel with performing the access to the stack memory. If the corresponding data is not stored within the stack memory, then an access to the cache line oriented storage may be performed. Advantageously, the data is retrieved for stack accesses even when the data is not stored within the stack memory. Since the address generation is performed in parallel with the stack memory access, the amount of time consumed to perform the cache line oriented storage access may be substantially equal to the time to perform non-stack data accesses to the cache line oriented storage. Therefore, no time penalty may be assessed for missing the stack memory.

A stack memory as described herein may be particularly beneficial with respect to subroutine parameter passing. The calling routine may perform multiple push commands to place parameters for use by the subroutine onto the stack. The subroutine may then access and modify the parameters upon the stack. Finally, the calling routine may perform multiple pop commands to remove the parameters from the stack. These push, access, and pop memory operations may be advantageously performed without generating an address as long as the requested data is stored in the stack memory. Execution of subroutines may thereby be more efficient than previously achievable utilizing conventional caching structures.

Broadly speaking, the present invention contemplates a method for manipulating data in a microprocessor. The method comprises several steps. Non-stack data is stored into a cache storage, while stack data is stored into a stack storage and transmitted to the cache storage when a push command is received. Stack data is discarded from the stack storage when a pop command is received.

The present invention further contemplates a data cache, comprising a cache storage, a stack storage, and three buses. The cache storage is configured to store non-stack data. The stack storage is configured to store stack data. Coupled to the cache storage and the stack storage, the control unit is configured to control storing of stack data into the stack storage and discarding of stack data from the stack storage according to received push and pop commands. A first of the three buses is configured to convey an address to the data cache, and is coupled to the cache storage and the control unit. A second of the three buses is configured to convey data associated with the address to the data cache, and is coupled to the cache storage and the stack storage. Finally, coupled to the cache storage and the control unit is the third of the three buses. The third bus is configured to convey control information including indications of push and pop commands to the data cache.

The present invention still further contemplates a microprocessor comprising a data cache coupled to a load/store unit. The data cache is configured to store stack data in a first storage and non-stack data in a second storage separate from the first storage. Stack data is identified by push and pop commands. The load/store unit is configured to convey push and pop commands to the data cache upon a control bus coupled therebetween.

BRIEF DESCRIPTION OF THE DRAWINGS

Other objects and advantages of the invention will become apparent upon reading the following detailed description and upon reference to the accompanying drawings in which.

Figure 1:
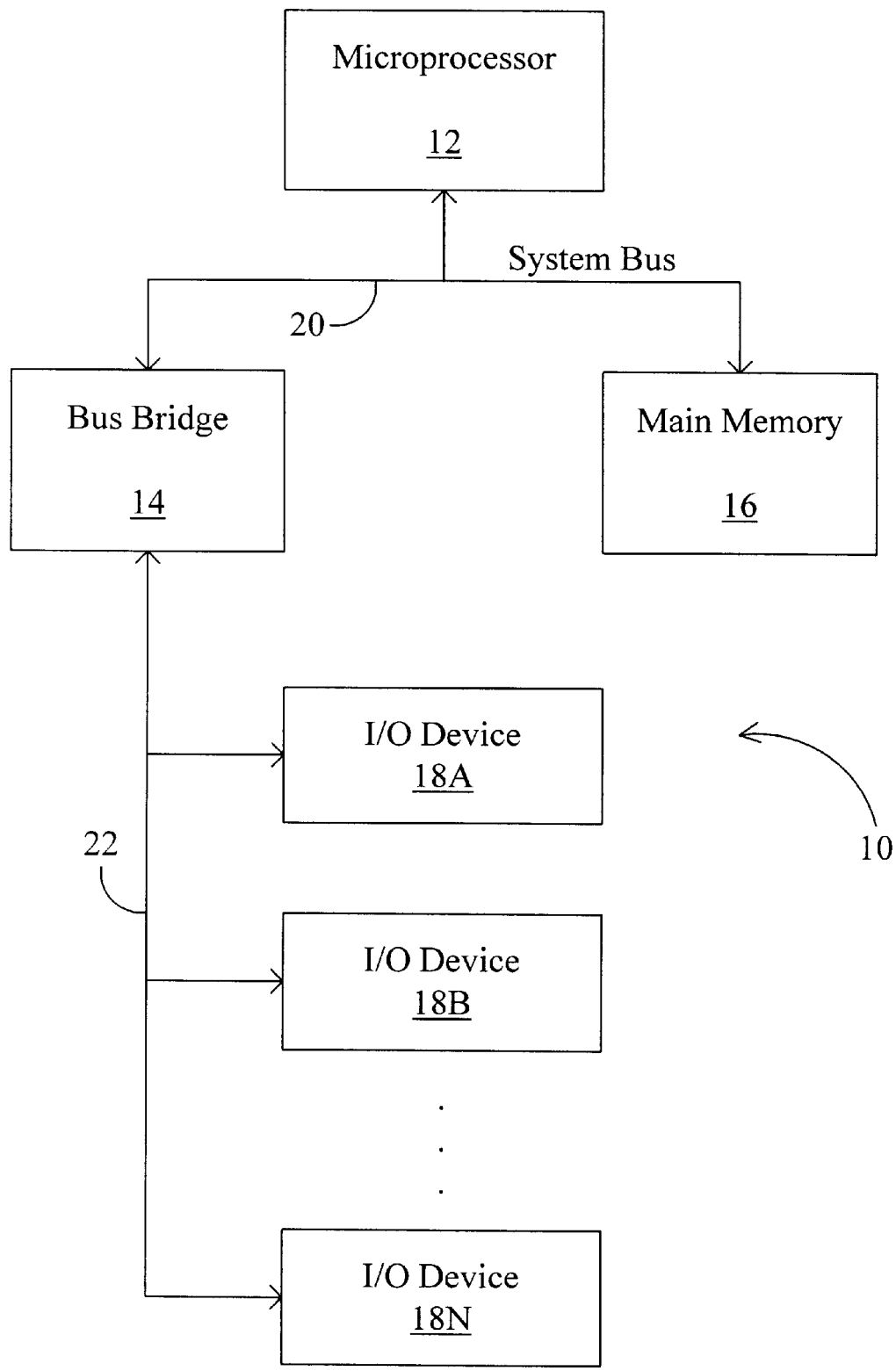
FIG. 1 is a block diagram of a computer system including a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, one embodiment of a computer system 10 is shown. Computer system 10 includes a microprocessor 12, a bus bridge 14, a main memory 16, and a plurality of input/output (I/O) devices 18A–18N (collectively referred to as I/O devices 18). A system bus 20 couples microprocessor 12, bus bridge 14, and main memory 16. I/O devices 18A–18N are coupled to bus bridge 14 via an I/O bus 22.

Generally speaking, microprocessor 12 executes sequences of instructions ("programs") stored in main memory 16 and operates upon data stored in main memory 16. In order to improve data access times, microprocessor 12 includes a data cache configured to store data operated upon by microprocessor 12. Additionally, the data cache is configured to store stack data separate from non-stack data. As used herein, the term "stack data" refers to data stored in memory locations within main memory 16 which are allocated to a stack data structure. In the x86 microprocessor architecture, for example, stack data is stored in memory locations within a stack segment. The top of the stack is defined by the ESP register. Also, the EBP register is often used to define an address within the stack from which offsets can be applied to access certain memory locations.

The data cache stores the stack data within a stack memory which is controlled in a stack-like manner, as opposed to the line oriented organization of the conventional data cache storage. Data is pushed into the stack memory and popped from the stack memory in response to push and pop commands, respectively. Since the data cache stores the top of the stack in a readily available fashion, push and pop commands simply access and modify the top of the stack instead of determining the memory locations which currently represent the top of the stack. Still further, accesses to stack data may be performed by specifying the offset of the desired data from the top of the stack. Such an offset is often included as a constant field within an instruction, and thus need not be computed by the microprocessor. Advantageously, the address of the memory locations presently storing the top of the stack need not be generated. Often, such an address generation requires an extra clock cycle. Therefore, stack data stored in the data cache described herein may be accessed more quickly than stack data stored in a conventional data cache (which requires a memory address to index into the data cache).

A stack memory as described herein may be particularly useful for passing parameters between a calling routine and a subroutine in a program. The calling routine may perform multiple push commands to place parameters for use by the subroutine onto the stack. The subroutine may then access and modify the parameters upon the stack using offsets from the top of the stack, or offsets from a point within the stack such as a point indicated by the EBP register. Finally, the calling routine may perform multiple pop commands to remove the parameters from the stack. Parameters which are modified by the subroutine may be utilized by the calling routine. These push, access, and pop memory operations may be advantageously performed without generating an address as long as the requested data is stored in the stack memory.

As used herein, "push commands" refer to commands to push data onto the top of the stack. In the x86 architecture, push commands include the PUSH instruction and the CALL instruction, among others. "Pop commands" refer to commands to pop data from the top of the stack. In the x86 architecture, pop commands include the POP instruction and the RET instruction, among others.

Bus bridge 14 is provided to assist in communications between I/O devices 18 and devices coupled to system bus 20. I/O devices 18 typically require longer bus clock cycles than microprocessor 12 and other devices coupled to system bus 20. Therefore, bus bridge 14 provides a buffer between system bus 20 and input/output bus 22. Additionally, bus bridge 14 translates transactions from one bus protocol to another. In one embodiment, input/output bus 22 is an Enhanced Industry Standard Architecture (EISA) bus and bus bridge 14 translates from the system bus protocol to the EISA bus protocol. In another embodiment, input/output bus 22 is a Peripheral Component Interconnect (PCI) bus and bus bridge 14 translates from the system bus protocol to the PCI bus protocol. It is noted that many variations of system bus protocols exist. Microprocessor 12 may employ any suitable system bus protocol.

I/O devices 18 provide an interface between computer system 10 and other devices external to the computer system. Exemplary I/O devices include a modem, a serial or parallel port, a sound card, etc. I/O devices 18 may also be referred to as peripheral devices. Main memory 16 stores data and instructions for use by microprocessor 12. In one embodiment, main memory 16 includes at least one Dynamic Random Access Memory (DRAM) cell and a DRAM memory controller.

It is noted that although computer system 10 as shown in FIG. 1 includes one microprocessor, other embodiments of computer system 10 may include multiple microprocessors similar to microprocessor 12. Similarly, computer system 10 may include multiple bus bridges 14 for translating to multiple dissimilar or similar I/O bus protocols. Still further, a cache memory for enhancing the performance of computer system 10 by storing instructions and data referenced by microprocessor 12 in a faster memory storage may be included. The cache memory may be inserted between microprocessor 12 and system bus 20, or may reside on system bus 20 in a "lookaside" configuration.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

Figure 2:
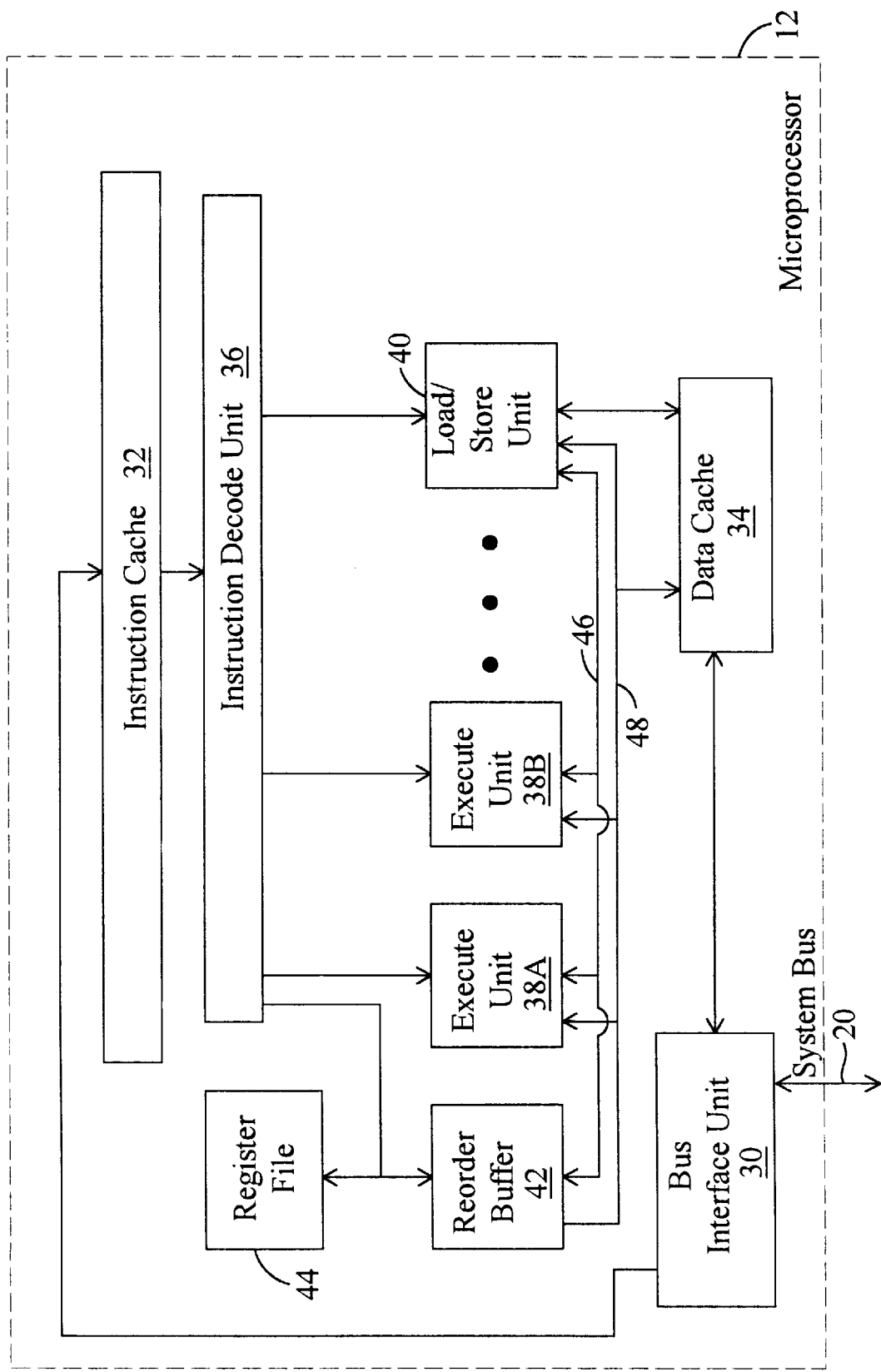
FIG. 2 is a block diagram of one embodiment of the microprocessor shown in FIG. 1, including a data cache.

Turning now to FIG. 2, a block diagram of one embodiment of microprocessor 12 is shown. Microprocessor 12 includes a bus interface unit 30, an instruction cache 32, a data cache 34, an instruction decode unit 36, a plurality of execute units including execute units 38A and 38B, a load/store unit 40, a reorder buffer 42, and a register file 44. The plurality of execute units will be collectively referred to herein as execute units 38, and may include more execute units than execute units 38A and 38B shown in FIG. 2. Additionally, an embodiment of microprocessor 12 may include one execute unit 38. Bus interface unit 30 is coupled to instruction cache 32, data cache 34, and system bus 20. Instruction cache 32 is coupled to instruction decode unit 36, which is further coupled to execute units 38, reorder buffer 42, register filed 44 and load/store unit 40. Reorder buffer 42, execute units 38, data cache 34, and load/store unit 40 are each coupled to a result bus 48 for forwarding of execution results. Load/store unit 40 is also coupled to data cache 34.

Generally speaking, data cache 34 is configured to store stack and non-stack data. Data cache 34 stores stack data in a separate memory from the non-stack data, and accepts push and pop commands from load/store unit 40 for manipulating the stack data. Additionally, accesses to stack data which are not the result of push or pop commands ("stack accesses") are performed to the stack memory utilizing the offset of the access from the top of the stack. Load/store unit 40 is configured to detect push and pop commands as well stack accesses, and performs these operations in program order with respect to each other. Load/store unit 40 may be configured to perform other memory operations out of order. It is noted that, for embodiments of microprocessor 12 employing the x86 microprocessor architecture, many of these memory operations are dependent upon each other for the value of the ESP or EBP register. Therefore, these operations naturally occur in order.

Load/store unit 40 is further configured, upon detection of a stack access or push/pop command, to calculate the address of the access concurrently with providing the offset or command to data cache 34. The stack data memory within data cache 34 is finite in size and stores only values near the top of the stack. Therefore, the stack data requested by an access may not be stored within the stack data memory. Data cache 34 signals load/store unit 40 when a stack access is performed for which corresponding data is not stored within the stack memory, and load/store unit 40 performs the access as a typical memory operation to the conventional portion of data cache 34. In this manner, cases in which desired data is not stored within the stack memory are performed correctly. Cases in which desired data is stored within the stack memory are advantageously performed without waiting for the address to be generated, thereby decreasing the amount of time utilized to perform such operations.

Instruction cache 32 is a high speed cache memory for storing instructions. It is noted that instruction cache 32 may be configured into a set-associative or direct-mapped configuration. Instruction cache 32 may additionally include a branch prediction mechanism for predicting branch instructions as either taken or not taken. Instructions are fetched from instruction cache 32 and conveyed to instruction decode unit 36 for decode and dispatch to an execute unit 38 or load/store unit 40.

Instruction decode unit 36 decodes instructions. As used herein, "decoding" refers to transforming the instruction from the format defined by the microprocessor architecture employed by microprocessor 12 into a second format expected by execute units 38. Often, the second format comprises decoded control signals for controlling data flow elements such as adders and multiplexors in order to perform the operation the instruction defines. In the embodiment shown, instruction decode unit 36 decodes each instruction fetched from instruction cache 32. Instruction decode unit 36 dispatches the instruction to execute units 38 and/or load/store unit 40. Instruction decode unit 36 also detects the register operands used by the instruction and requests these operands from reorder buffer 42 and register file 44. In one embodiment, execute units 38 are symmetrical execution units. Symmetrical execution units are each configured to execute a particular subset of the instruction set employed by microprocessor 12. The subsets of the instruction set executed by each of the symmetrical execution units are the same. In another embodiment, execute units 38 are asymmetrical execution units configured to execute dissimilar instruction subsets. For example, execute units 38 may include a branch execute unit for executing branch instructions, one or more arithmetic/logic units for executing arithmetic and logical instructions, and one or more floating point units for executing floating point instructions. Instruction decode unit 36 dispatches an instruction to an execute unit 38 or load/store unit 40 which is configured to execute that instruction.

Load/store unit 40 provides an interface between execute units 38 and data cache 34. Additionally, memory dependencies between load and store memory operations are detected and handled by load/store unit 40.

Execute units 38 and load/store unit 40 may include one or more reservation stations for storing instructions whose operands have not yet been provided. An instruction is selected from those stored in the reservation stations for execution if: (1) the operands of the instruction have been provided, and (2) the instructions which are prior to the instruction being selected have not yet received operands. It is noted that a centralized reservation station may be included instead of separate reservation stations. The centralized reservation station may be coupled between instruction decode unit 36, execute units 38, and load/store unit 40. Such an embodiment may perform the dispatch function within the centralized reservation station.

Microprocessor 12 supports out of order execution, and employs reorder buffer 42 for storing execution results of speculatively executed instructions and for storing these results into register file 44 in program order; for performing dependency checking and register renaming; and for providing for mispredicted branch and exception recovery. When an instruction is decoded by instruction decode unit 36, requests for register operands are conveyed to reorder buffer 42 and register file 44. In response to the register operand requests, one of three values is transferred to the execute unit 38 and/or load/store unit 40 which receives the instruction: (1) the value stored in reorder buffer 42, if the value has been speculatively generated; (2) a tag identifying a location within reorder buffer 42 which will store the value, if the value has not been speculatively generated; or (3) the value stored in the register within register file 44, if no instructions within reorder buffer 42 modify the register. Additionally, a storage location within reorder buffer 42 is allocated for storing the results of the instruction being decoded by instruction decode unit 36. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register. Tags and/or operand values are conveyed upon an operand tags/value bus 46.

When execute units 38 or load/store unit 40 execute an instruction, the tag assigned to the instruction by reorder buffer 42 is conveyed upon result bus 48 along with the result of the instruction. Reorder buffer 42 stores the result in the indicated storage location. Additionally, execute units 38 and load/store unit 40 compare the tags conveyed upon result bus 48 with tags of operands for instructions stored therein. If a match occurs, the unit captures the result from result bus 48 and stores it with the corresponding instruction. In this manner, an instruction may receive the operands it is intended to operate upon. Capturing results from result bus 48 for use by instructions is referred to as "result forwarding".

Instruction results are stored into register file 44 by reorder buffer 42 in program order. Storing the results of an instruction and deleting the instruction from reorder buffer 42 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 42 discards the instructions subsequent to the mispredicted branch instruction or the instruction causing the exception. Instructions thus discarded are also flushed from execute units 38, load/store unit 40, and instruction decode unit 36.

Details regarding suitable reorder buffer implementations may be found within the publication "Superscalar Microprocessor Design" by Mike Johnson, Prentice-Hall, Englewood Cliffs, N.J., 1991, and within U.S. Pat. No. 5,664,136 entitled "High Performance Superscalar Microprocessor Including a Dual-Pathway Circuit for Converting CISC Instructions to RISC Operations", issued Sep. 2, 1997 to Witt, et al. These documents are incorporated herein by reference in their entirety.

Register file 44 includes storage locations for each register defined by the microprocessor architecture employed by microprocessor 12. For example, microprocessor 12 may employ the x86 microprocessor architecture. For such an embodiment, register file 44 includes locations for storing the EAX, EBX, ECX, EDX, ESI, EDI, ESP, and EBP register values.

Bus interface unit 30 is configured to effect communication between microprocessor 12 and devices coupled to system bus 20. For example, instruction fetches which miss instruction cache 32 may be transferred from main memory 16 by bus interface unit 30. Similarly, memory operations performed by load/store unit 40 which miss data cache 34 may be transferred from main memory 16 by bus interface unit 30. Additionally, data cache 34 may discard a cache line of data which has been modified by microprocessor 12. Bus interface unit 30 transfers the modified line to main memory 16.

It is noted that instruction decode unit 36 may be configured to dispatch an instruction to more than one execution unit. For example, in embodiments of microprocessor 12 which employ the x86 microprocessor architecture, certain instructions may operate upon memory operands. Executing such an instruction involves transferring the memory operand from data cache 34, executing the instruction, and transferring the result to memory (if the destination operand is a memory location). Load/store unit 40 performs the memory transfers, and an execute unit 38 performs the execution of the instruction. It is further noted that instruction decode unit 36 may be configured to decode multiple instructions per clock cycle. In one embodiment, instruction decode unit 36 is configured to decode and dispatch up to one instruction per execute unit 38 and load/store unit 40 per clock cycle.

Figure 3:
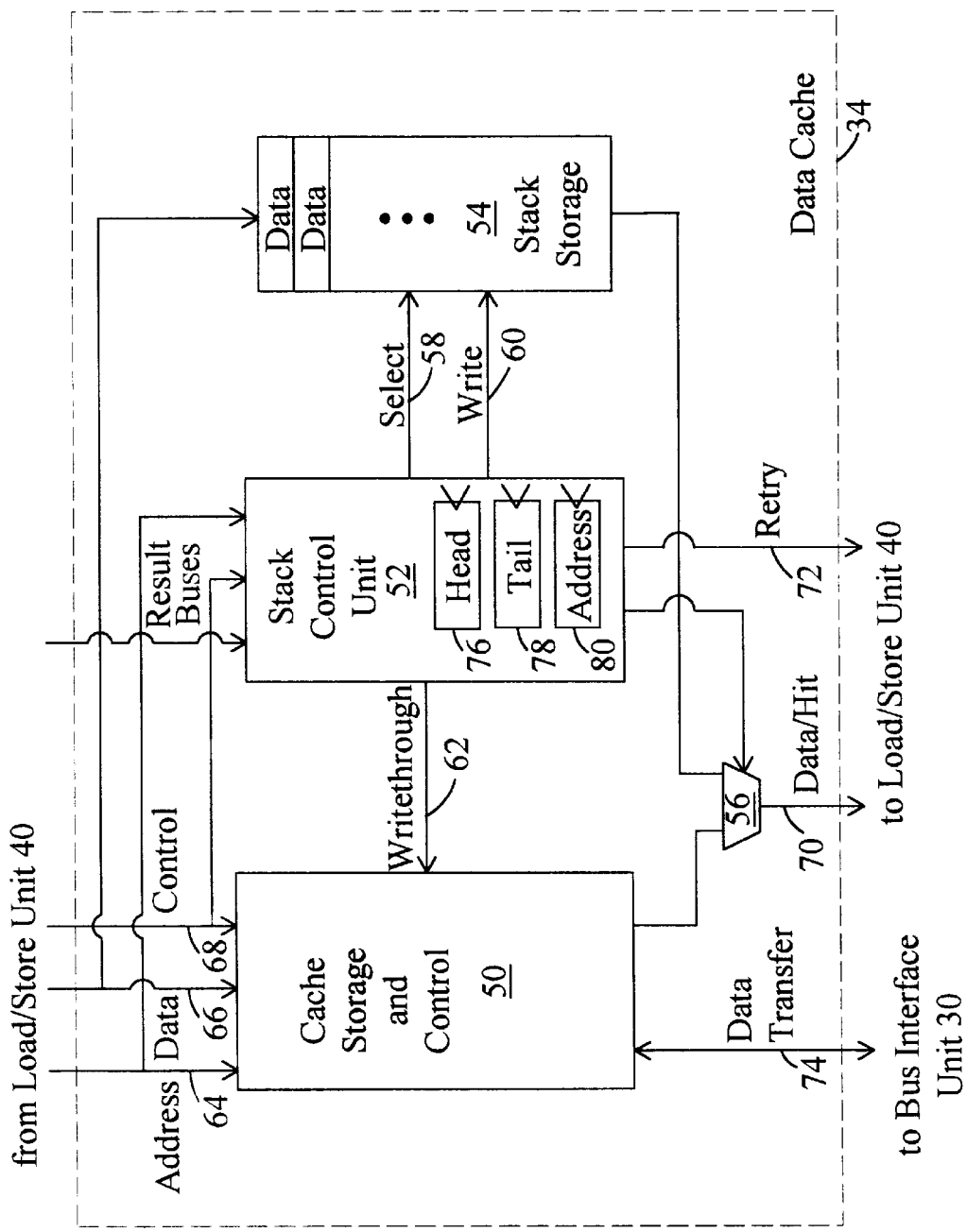
FIG. 3 is a block diagram of one embodiment of the data cache shown in FIG. 2.

Turning next to FIG. 3, a block diagram of one embodiment of data cache 34 is shown. In the embodiment shown, data cache 34 includes cache storage and control unit 50, stack control unit 52, stack storage 54, and multiplexor 56. Stack control unit 52 is coupled to stack storage 54 via a select bus 58 and a write conductor 60. A writethrough bus 62 is coupled between stack control unit 52 and cache storage and control unit 50. Load store unit 40 provides addresses, data, and control signals upon address bus 64, data bus 66, and control bus 68, respectively. Address bus 64 and control bus 68 are coupled to cache storage and control unit 50 and stack control unit 52. Data bus 66 is coupled to cache storage and control unit 50 and stack storage 54. Data and hit information provided by cache storage and control unit 50 and by stack storage 54 is conveyed to multiplexor 56, which selects information from one unit or the other in response to a select signal provided by stack control unit 52. Data/hit bus 70 thereby transmits the selected information to load/store unit 40. Additionally, stack control unit 52 provides a retry signal upon retry line 72 to load/store unit 40. A data transfer bus 74 is coupled between cache storage and control unit 50 and bus interface unit 30.

Stack storage 54 comprises a stack memory for the embodiment of FIG. 3. Stack storage 54 includes a plurality of storage locations, and each storage location is configured to store a data word. As used herein, a "data word" refers to one or more bytes of data logically accessed by microprocessor 12 as a single unit. A data word may comprise 1, 2, or 4 bytes in one embodiment, depending upon the operand size employed by the instruction which forms the address. In one embodiment, stack storage 54 comprises a memory array of storage locations, while in another embodiment stack storage 54 comprises a plurality of registers.

Stack control unit 52 receives control bus 68 from load/store unit 40 and operates stack storage 54 in response to the control inputs. Control bus 68 includes a plurality of control signals. Control signals are included for indicating that a pop command, a push command, or an access to stack data via an offset is being performed. When an access via offset is performed, the offset is conveyed upon address bus 64.

In response to a push command, stack control unit 52 selects a storage location within stack storage 54 for storing the pushed data. The selected storage location is signaled to stack storage 54 via select bus 58, and a write signal upon write conductor 60 is asserted to indicate that stack storage 54 should store the data provided upon data bus 66 into the selected storage location. Stack control unit 52 selects a storage location adjacent to the storage location presently storing the top of the stack for storing the pushed data, and the selected storage location is indicated to be the top of the stack.

In response to a pop command, stack control unit 52 selects the storage location presently storing the top of the stack. The write signal is deasserted, indicating that a read of the storage location is desired. The selected data word is provided to multiplexor 56, and stack control unit 52 causes multiplexor 56 to select the data word. The data word is thereby provided to load/store unit 40 upon data/hit bus 70.

In response to an access to stack data via an offset, stack control unit 52 selects a storage location which is storing a data word located below the top of the stack by an amount represented by the offset. Otherwise, the access is performed similar to a push or pop command.

In the embodiment shown, stack control unit 52 operates stack storage 54 as a circular buffer having a head pointer and a tail pointer. The head pointer indicates a storage location within stack storage 54 storing the data word at the top of the stack. The tail pointer indicates a storage location within stack storage 54 storing the last valid data word within stack storage 54. In other words, the tail pointer indicates the bottom of the stack as stored within stack storage 54. Once the bottom of the stack is reached via pop commands, stack storage 54 is empty. Stack storage 54 is empty, therefore, when the head pointer and the tail pointer indicate the same storage location within stack storage 54. Stack control unit 52 includes a head register 76 and a tail register 78 for storing the head and tail pointers, respectively.

Since push and pop commands change the location storing the top of the stack, the head pointer is adjusted when these commands are performed. The head pointer is adjusted to indicate the storage location selected to store the pushed data when a push command is performed. When a pop command is performed, the head pointer is adjusted to indicate the storage location storing the top of the stack subsequent to the pop command (i.e. the storage location second to the top of the stack prior to execution of the pop command). The adjustment of the head pointer in either case may be an increment or a decrement, dependent upon the current arrangement of data words within the circular buffer.

Stack control unit 52 is further configured to transmit data which is stored into stack storage 54 to cache storage and control unit 50. In this manner, stack storage 54 does not store the most up-to-date copy of the data. Such a configuration is often referred to as "writethrough" since whenever a write occurs, the data is written through to another memory. Writethrough bus 62 is provided for transmitting the address and associated data to cache storage and control unit 50. It is noted that stack control unit 52 does not receive addresses with the aforementioned accesses. Instead, an address register 80 is included within stack control unit 52. Address register 80 stores an address indicative of the top of the stack. The address is decremented when push commands are performed, and incremented when pop commands are performed. An adder circuit (not shown) is included within stack control unit 52 for creating addresses of store memory operations accessing the stack via an offset. The addresses thus created are conveyed upon writethrough bus 62 along with the updated data word for storage in cache storage and control unit 50.

In one embodiment, address register 80 comprises the ESP register of the x86 microprocessor architecture. Therefore, stack control unit 52 receives result buses 48 from execute units 38. Results conveyed upon result bus 48 include an indication of the register into which the results are to be stored. When stack control unit 52 detects a modification to the ESP register, stack control unit 52 stores the received value into address register 80. Additionally, stack control unit 52 discards the data stored in stack storage 54 (i.e. makes the head pointer equal to the tail pointer). Stack storage 54 thereby becomes empty and begins receiving data with subsequent push and pop commands. In another embodiment, stack storage 54 fetches data words corresponding to the top of the stack as indicated by the updated address stored within address register 80 from cache storage and control unit 50.

In another embodiment, a second address register similar to address register 80 is included within stack control unit 52. The second address register is used to store a value indicative of a point within the stack, thereby enabling stack accesses using offsets from the top of the stack or the point within the stack. Control bus 68 includes an indication of which address register the offset is measured from, and stack cache control unit 52 calculates the appropriate storage location within stack storage 54 which is accessed. For example, an offset measured from the second address register may be transformed into an offset measured from the first address register by adding the difference between the first and second address registers to the offset.

Certain accesses to stack storage 54 may be performed when the requested data word is not stored in stack storage 54. For example, a pop command may be performed when stack storage 54 is empty. Additionally, an access performed via an offset from the top of the stack may request a data word which is not stored within storage 54. In this case, the offset is larger than the difference between the head and the tail pointer. When such accesses occur, stack control unit 52 asserts a retry signal upon retry conductor 72 to load/store unit 40. As noted above, load/store unit 40 performs an address calculation in parallel with performing a push or pop command or a stack access. If the retry signal is asserted in response to an access, load/store unit 40 presents the address upon address bus 64 as a typical data access. Cache storage and control unit 50 receives the address and searches its storage for the corresponding data, similar to non-stack data accesses.

It is noted that, for clock cycles in which a non-stack data access is performed, stack control unit 52 directs multiplexor 56 to select data and cache hit information from cache storage and control unit 50. In this manner, non-stack data accesses (and stack data accesses performed to cache storage and control unit 50 due to a retry signal from the corresponding access to stack storage 54) are responded to upon data/hit bus 70.

Cache storage and control unit 50 forms a cache for non-stack data. Cache storage and control unit 50 includes storage for a plurality of cache lines and corresponding tags. Control circuitry is additionally included for managing the allocation and deallocation of storage locations to particular cache lines, for accessing data stored within the cache storage, and for effecting communication with bus interface unit 30 via data transfer bus 74. Cache storage and control unit 50 may be configured according to a direct-mapped or set-associative configuration.

In accordance with the above disclosure, a data cache has been described which stores stack data separate from non-stack data. The stack data may be accessed without performing an address calculation step, advantageously reducing the time employed for performing stack data accesses. Programs which perform stack data accesses often may enjoy increased performance through utilization of the data cache described herein.

Numerous variations and modifications will become apparent to those skilled in the art once the above disclosure is fully appreciated. It is intended that the following claims be interpreted to embrace all such variations and modifications.

What is claimed is:

1. A method for manipulating data in a microprocessor, the method comprising:
   storing non-stack data into a cache storage;
   receiving stack data and an indication of a push command;
   storing said stack data into a stack storage in response to receiving said indication of said push command, said storing being performed without waiting for address generation;
   calculating a cache write address in said cache storage and transmitting said stack data to a storage location corresponding to said cache write address in said cache storage in response to receiving said indication of said push command;
   receiving an indication of a pop command; and
   discarding said stack data from said stack storage in response to receiving said indication of said pop command.

2. The method as recited in claim 1 wherein said storing said stack data comprises adjusting a head pointer, wherein said head pointer is indicative of a first storage location within said stack storage, and wherein said first storage location is storing data which forms a top of a stack.

3. The method as recited in claim 2 wherein said discarding comprises adjusting said head pointer.

4. The method as recited in claim 2 wherein said adjusting said head pointer comprises adjusting a register within a control unit coupled to said stack storage.

5. The method as recited in claim 2 further comprising receiving an offset and accessing a second storage location within said stack storage below said top of the stack by an amount specified by said offset.

6. The method as recited in claim 4 further comprising:
   calculating a cache access address concurrent with accessing said second storage location within said stack storage;
   accessing said cache storage with said cache access address if said second storage location is below a bottom of the stack.

7. A data cache, comprising:
   a cache storage configured to store non-stack data;
   a stack storage configured to store stack data;
   a control unit coupled to said cache storage and said stack storage, said control unit configured to control storing and discarding of stack data into a location in said stack storage indicated by a head pointer according to received push and pop commands respectively and without waiting for address generation;
   a first bus configured to convey an address to said data cache, said first bus coupled to said cache storage and said control unit;
   a second bus configured to convey data associated with said address to said data cache, said second bus coupled to said cache storage and said stack storage; and
   a third bus configured to convey control information including indications of said push and pop commands to said data cache, said third bus coupled to said cache storage and said control unit.

8. The data cache as recited in claim 7 wherein said control unit comprises an address register configured to store an address indicative of a top of the stack.

9. The data cache as recited in claim 8 wherein said control unit is configured to transmit data to said cache storage concurrent with storing said data into said stack storage.

10. The data cache as recited in claim 9 wherein said control unit calculates a data address for transmittal to said cache storage from said address indicative of said top of the stack.

11. The data cache as recited in claim 7 wherein said control unit comprises a register configured to store a head pointer, wherein said head pointer is indicative of a storage location within said stack storage which is storing data which forms a top of the stack.

12. The data cache as recited in claim 11 wherein said control unit selects stack data to be discarded from a storage location indicated by said head pointer.

13. The data cache as recited in claim 11 wherein said control unit selects a storage location adjacent to the storage location indicated by said head pointer to store stack data.

14. The data cache as recited in claim 11 wherein said control unit further comprises a tail pointer register configured to store a tail pointer.

15. The data cache as recited in claim 14 wherein said tail pointer is indicative of a storage location storing a last valid entry within said stack storage.

16. The data cache as recited in claim 14 wherein said stack storage is empty during times that said head pointer is equal to said tail pointer.

17. A microprocessor comprising:

a data cache configured to store stack data in a first storage and non-stack data in a second storage separate from said first storage said data cache being further configured to store said stack data at a location indicated by a head pointer without waiting for address generation, wherein said stack data is identified by push and pop commands; and a load/store unit coupled to said data cache, wherein said load/store unit is configured to convey said push and pop commands to said data cache upon a control bus coupled therebetween.

18. The microprocessor as recited in claim 17 further comprising an address bus and data bus coupled between said load/store unit and said data cache, wherein said load/store unit is configured to convey addresses upon said address bus and corresponding data upon said data bus to said data cache.

* * * * *